United States Patent
Liu et al.

(10) Patent No.: US 9,749,988 B2
(45) Date of Patent: Aug. 29, 2017

(54) CALLED RECOVERY METHOD, APPARATUS, AND SYSTEM

(71) Applicant: Huawei Technologies Co., Ltd., Shenzhen, Guangdong (CN)

(72) Inventors: Haiyang Liu, Shenzhen (CN); Biao Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 476 days.

(21) Appl. No.: 14/316,249

(22) Filed: Jun. 26, 2014

(65) Prior Publication Data
US 2014/0308983 A1 Oct. 16, 2014

Related U.S. Application Data

(63) Continuation of application No. PCT/CN2011/084654, filed on Dec. 26, 2011.

(51) Int. Cl.
*H04W 68/02* (2009.01)
*H04W 68/12* (2009.01)
(Continued)

(52) U.S. Cl.
CPC ........... *H04W 68/02* (2013.01); *H04W 68/12* (2013.01); *H04W 8/12* (2013.01); *H04W 24/04* (2013.01);
(Continued)

(58) Field of Classification Search
CPC ................................ H04W 88/14; H04W 24/04
See application file for complete search history.

(56) References Cited

U.S. PATENT DOCUMENTS 6,408,182 B1   6/2002  Davidson et al.
8,682,322 B2 *  3/2014  Wallis .............. H04W 36/0022
                                              455/433
(Continued)

FOREIGN PATENT DOCUMENTS

CN        1859698 A    11/2006
CN      101047900 A    10/2007
WO    WO 2009094916 A1   8/2009

*Primary Examiner* — Vladimir Magloire
*Assistant Examiner* — Frank Donado
(74) *Attorney, Agent, or Firm* — Leydig, Voit & Mayer, Ltd.

(57) ABSTRACT

Embodiments of the present invention provide a called recovery method, including: receiving, by a target mobile switching center MSC, a provide roaming number PRN message sent by a backup MSC corresponding to a faulty MSC, where the PRN message carries an instruction for initiating paging to a called terminal through a mobility management entity MME; and performing international mobile subscriber identity IMSI paging according to the instruction, so that an MME to which a called terminal is attached controls the called terminal to perform circuit switched fallback CSFB to complete a called connection. Correspondingly, the embodiments of the present invention further provide a mobile switching center and a called recovery system. This solves a problem that in an MSC pool architecture, called paging in a CS domain cannot be performed when a terminal corresponding to a faulty MSC is attached to an E-UTRAN, and improves paging reliability.

17 Claims, 3 Drawing Sheets

---

┌─ S101
A target MSC receives a PRN message sent by a backup MSC corresponding to a faulty MSC, where the PRN message carries an instruction for initiating paging to a called terminal through an MME ┌─ S102
The target MSC performs IMSI paging according to the instruction for initiating paging to a called terminal through the MME, so that an MME to which a called terminal is attached controls the called terminal to perform CSFB to complete a called connection (51) Int. Cl.
    *H04W 92/02*     (2009.01)
    *H04W 24/04*     (2009.01)
    *H04W 76/02*     (2009.01)
    *H04W 88/14*     (2009.01)
    *H04W 36/00*     (2009.01)
    *H04W 8/12*      (2009.01)

(52) U.S. Cl.
    CPC ...... *H04W 36/0022* (2013.01); *H04W 76/026* (2013.01); *H04W 88/14* (2013.01); *H04W 92/02* (2013.01)

(56) References Cited

U.S. PATENT DOCUMENTS

| | | | |
|---|---|---|---|
| 2009/0209252 A1* | 8/2009 | Han | H04W 8/04 455/433 |
| 2010/0302937 A1 | 12/2010 | Hu et al. | |
| 2011/0013623 A1* | 1/2011 | Hu | H04W 68/12 370/355 |
| 2012/0315906 A1* | 12/2012 | Stephens | H04W 24/04 455/436 |
| 2013/0259001 A1* | 10/2013 | Keller | H04W 76/027 370/331 |

* cited by examiner

CALLED RECOVERY METHOD, APPARATUS, AND SYSTEM

CROSS-REFERENCE TO RELATED APPLICATIONS

This application is a continuation of International Patent Application No. PCT/CN2011/084654, filed on Dec. 26, 2011, which is hereby incorporated by reference in its entirety.

TECHNICAL FIELD

Embodiments of the present invention relate to the field of communications technologies, and in particular, to a called recovery method, apparatus, and system.

BACKGROUND

In an existing long term evolution (LTE) network architecture, if a terminal receives a circuit switched (CS) paging message on an evolved UMTS territorial radio access network (E-UTRAN) network, the terminal needs to return from the E-UTRAN to an UMTS territorial radio access network (UTRAN)/a GSM EDGE radio access network (GERAN) so as to perform the CS service. In this case, an SGs association needs to be established between a mobility management entity (MME) and an MSC for the terminal. An architecture and a processing method for performing the CS service based on the SGs association are referred to as circuit switched fallback (CS fallback, CSFB).

On a conventional mobile communications network, one base station controller (BSC) can only be connected to one mobile switching center (MSC), whereas in an MSC pool networking architecture, one BSC may be connected to multiple MSCs. Compared with conventional networking, the networking has some obvious advantages, such as load sharing, disaster recovery, reduction of inter-MSC location updates, and reduction of inter-MSC handovers.

In the MSC pool architecture, when a terminal is attached to the E-UTRAN and the terminal has called paging in a CS domain, the MSC needs to instruct a corresponding MME to perform CSFB for the terminal to complete the called paging in the CS domain. If a certain MSC in an MSC pool is faulty, its corresponding backup MSC selects a non-faulty MSC to replace the faulty MSC. When the terminal is attached to the E-UTRAN and if the non-faulty MSC cannot find an MME to which the terminal is attached, the non-faulty MSC can only search for the terminal on the GERAN/UTRAN. Therefore, the non-faulty MSC cannot page the terminal, which causes that the called paging is unreachable.

SUMMARY

Embodiments of the present invention provide a called recovery method, apparatus, and system to solve a problem in the prior art that in an MSC pool architecture, called paging in a CS domain cannot be performed for a terminal corresponding to a faulty MSC when the terminal is attached to an E-UTRAN.

An embodiment of the present invention provides a called recovery method, including:

receiving, by a target mobile switching center MSC, a provide roaming number PRN message sent by a backup MSC corresponding to a faulty MSC, where the PRN message carries an instruction for initiating paging to a called terminal through a mobility management entity (MME); and performing, by the target MSC, international mobile subscriber identity IMSI paging according to the instruction for initiating paging to a called terminal through the MME, so that an MME to which a called terminal is attached controls the called terminal to perform circuit switched fallback CSFB to complete a called connection.

An embodiment of the present invention further provides another called recovery method, including:

receiving, by a backup MSC corresponding to a faulty mobile switching center MSC, a provide roaming number PRN message sent by a home location register HLR, and encapsulating an instruction for initiating paging to a called terminal through a mobility management entity (MME) in the PRN message; and determining a target MSC in an MSC pool to which the backup MSC belongs and sending the target MSC the PRN message that carries the instruction for initiating paging to a called terminal through the MME, so that the target MSC performs international mobile subscriber identity IMSI paging according to the instruction for initiating paging to a called terminal through the MME, and an MME to which a called terminal is attached controls the called terminal to perform circuit switched fallback CSFB to complete a called connection.

An embodiment of the present invention further provides a mobile switching center MSC, including:

a receiving unit, configured to receive a provide roaming number PRN message sent by a backup MSC corresponding to a faulty MSC, where the PRN message carries an instruction for initiating paging to a called terminal through a mobility management entity (MME); and a paging unit, configured to perform international mobile subscriber identity IMSI paging according to the instruction for initiating paging to a called terminal through the MME, so that an MME to which a called terminal is attached controls the called terminal to perform circuit switched fallback CSFB to complete a called connection.

An embodiment of the present invention further provides another mobile switching center MSC, including:

a receiving unit, configured to receive a provide roaming number PRN message sent by a home location register HLR;

an encapsulating unit, configured to encapsulate an instruction for initiating paging to a called terminal through a mobility management entity (MME) in the PRN message;

a determining unit, configured to determine a target MSC in an MSC pool to which the MSC belongs; and a sending unit, configured to send the target MSC the PRN message that carries the instruction for initiating paging to a called terminal through the MME, so that the target MSC performs international mobile subscriber identity IMSI paging according to the instruction for initiating paging to a called terminal through the MME, and an MME to which a called terminal is attached controls the called terminal to perform circuit switched fallback CSFB to complete a called connection.

An embodiment of the present invention further provides a called recovery communications system, including a backup mobile switching center MSC and a target MSC, where:

the backup MSC is configured to receive a provide roaming number PRN message sent by a home location register HLR, encapsulate an instruction for initiating paging to a called terminal through a mobility management entity (MME) in the PRN message, determine the target MSC in an MSC pool to which the backup MSC belongs, and send the target MSC the PRN message that carries the instruction for initiating paging to a called terminal through the MME; and the target MSC is configured to receive the PRN message that carries the instruction for initiating paging to a called terminal through the MME and is sent by the backup MSC, and perform IMSI paging according to the instruction for initiating paging to a called terminal through the MME, so that an MME to which a called terminal is attached controls the called terminal to perform circuit switched fallback CSFB to complete a called connection.

According to the method, the apparatus, and the communications system that are provided in the embodiments of the present invention, a target MSC performs IMSI paging by using an instruction for paging an MME, so that an MME to which a called terminal is attached controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1 of the Present Invention

Figure 1:
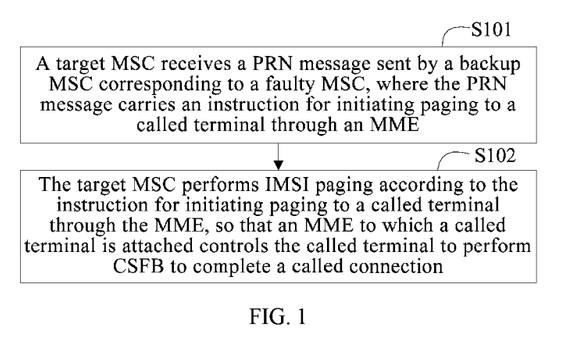
FIG. 1 is a flowchart of a method according to Embodiment 1 of the present invention.

FIG. 1 is a flowchart of a called recovery method according to an embodiment of the present invention. As shown in FIG. 1, the method may include:

S101. A target MSC receives a provide roaming number (PRN) message sent by a backup MSC corresponding to a faulty MSC, where the PRN message carries an instruction for initiating paging to a called terminal through a mobility management entity (MME).

It should be noted that before the target MSC receives the PRN message sent by the backup MSC corresponding to the faulty MSC, the backup MSC receives a PRN message sent by a home location register (HLR) and encapsulates the instruction for initiating paging to a called terminal through the MME in the PRN message. After the encapsulation, an MSC in an MSC pool to which the backup MSC belongs is determined as the target MSC, and the PRN message that carries the instruction for initiating paging to a called terminal through the MME is sent to the MSC. Specifically, for how to determine the target MSC, an MSC with the lowest load may be selected as the target MSC, or the target MSC may be selected by using other load balance algorithms. This is not limited in the present invention.

The instruction for initiating paging to a called terminal through the MME may be an address or an index of the MME or may be a CSFB identifier.

S102. Perform international mobile subscriber identity (IMSI) paging according to the instruction for initiating paging to a called terminal through the MME, so that an MME to which a called terminal is attached controls the called terminal to perform CSFB to complete a called connection.

If the instruction for initiating paging to a called terminal through the MME is the address or the index of the MME, the MSC performs the IMSI paging through the MME corresponding to the address or the index. Before the faulty MSC becomes faulty, an address or an index of an MME to which a terminal is attached has been determined, and a corresponding backup MSC obtains the address or the index of the MME by extending a backup interface. Therefore, the MME is the MME to which the called terminal is attached. After receiving the IMSI paging, the MME controls the terminal to perform the CSFB to complete the called connection.

If the instruction for initiating paging to a called terminal through the MME is the CSFB identifier, the MSC initiates, according to the CSFB identifier, the IMSI paging through all MMEs corresponding to the MSC pool. After receiving the IMSI paging, the MME to which the called terminal is attached controls the called terminal to perform the CSFB to complete the called connection, and other MMEs return IMSI paging failure messages.

The backup MSC, the target MSC, and the faulty MSC are located in a same MSC pool.

According to the method provided in this embodiment, a target MSC performs IMSI paging by using an instruction for paging an MME, so as to determine an MME to which a called terminal is attached, so that the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

Embodiment 2 of the Present Invention

Figure 2:
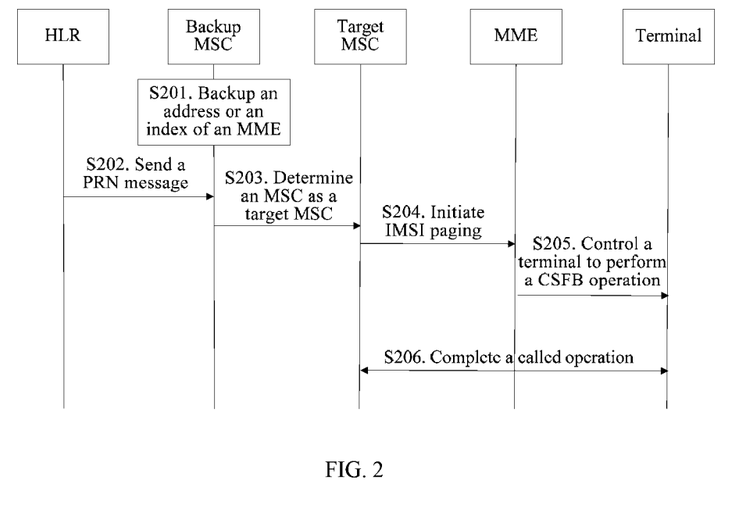
FIG. 2 is a flowchart of a method according to Embodiment 2 of the present invention.

As shown in FIG. 2, in this embodiment, a process of performing called recovery by an MSC is as follows:

S201. A backup MSC corresponding to a faulty MSC backs up an address or an index of an MME.

In an MSC pool architecture, one MSC has one corresponding MSC responsible for backing up information stored in the MSC, so that when a certain MSC is faulty, an MSC responsible for backup may select a non-faulty MSC to replace the faulty MSC to complete a call connection.

The MSC extends an original backup interface and backs up an address or an index of an MME stored in the faulty MSC, where the MME is an MME to which a called terminal is attached.

It should be noted that if the index of the MME is backed up, each MSC in the MSC pool needs to save addresses of all MMEs corresponding to the MSC pool.

S202. An HLR sends a PRN message to the backup MSC.

After detecting that the MSC is faulty, the HLR sends the PRN message to the backup MSC corresponding to the faulty MSC to instruct the MSC to perform a call response.

S203. The backup MSC determines an MSC as a target MSC.

The backup MSC determines an MSC in the MSC pool as the target MSC, so that the target MSC performs IMSI paging through the MME. A specific determination manner may be querying load situations of all MSCs in the MSC pool and selecting an MSC with the lowest load except the faulty MSC as the target MSC, or selecting an MSC as the target MSC according to other load balance algorithms.

After determining the target MSC, the backup MSC encapsulates the address or the index of the MME in the PRN message and sends the encapsulated PRN message to the target MSC; or the backup MSC may first perform encapsulation, and then determines the target MSC and performs sending. In addition, the target MSC returns a roaming number to the HLR.

S204. The target MSC initiates IMSI paging.

After receiving the PRN message, the target MSC directly initiates the IMSI paging through the MME according to the address of the MME, or the target MSC searches an MME address list according to the index of the MME to obtain the address of an MME to be paged and initiates the IMSI paging through the MME according to the address.

S205. The MME controls a terminal to perform a CSFB operation.

After receiving the IMSI paging of the target MSC, the MME controls the called terminal to perform the CSFB operation.

S206. The MSC pages the terminal to complete a called operation of the terminal.

After the completion of the CSFB, the terminal returns a paging response message to the MSC, and after receiving the message, the MSC establishes paging with the terminal to complete the called operation of the terminal.

According to the called recovery method provided in this embodiment, a target MSC performs IMSI paging by using an address or an index of an MME, so as to determine an MME to which a called terminal is attached, so that the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

Embodiment 3 of the Present Invention

Figure 3:
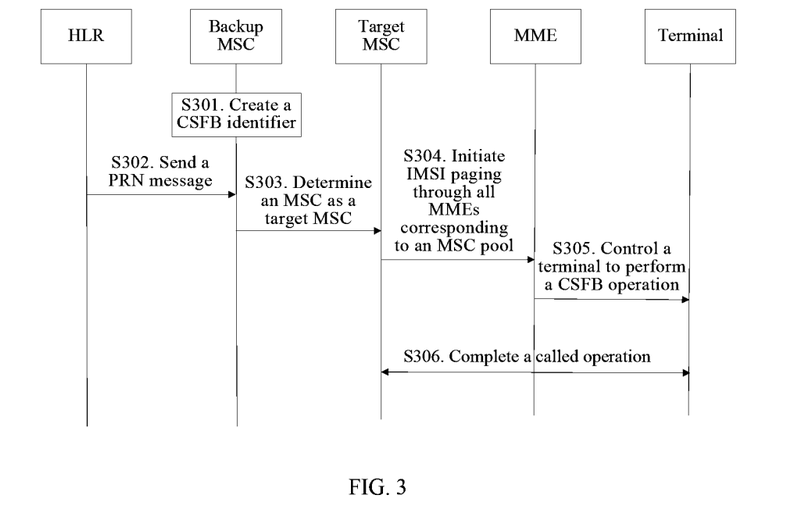
FIG. 3 is a flowchart of a method according to Embodiment 3 of the present invention.

In this embodiment, a process of performing called recovery by an MSC is as follows:

S301. A backup MSC creates a CSFB identifier.

In an MSC pool architecture, one MSC has one corresponding MSC responsible for backing up information stored in the MSC, so that when a certain MSC is faulty, an MSC responsible for backup may select a non-faulty MSC to replace the faulty MSC to complete a call connection.

The CSFB identifier may be in bit format or may be in character string format and indicates that IMSI paging through an MME is required.

Before the faulty MSC becomes faulty, when being attached to an E-UTRAN, a terminal sends a location update message to the faulty MSC, and the faulty MSC records the location update message of the terminal. The backup MSC determines, according to terminal information stored in the faulty MSC, which the terminal is on the E-UTRAN and creates the CSFB identifier.

S302 and S303 are the same as S202 and S203.

S304. A target MSC initiates IMSI paging through all MMEs corresponding to an MSC pool.

After receiving a PRN message, the target MSC initiates, according to the CSFB identifier, the IMSI paging through all MMEs corresponding to the MSC pool.

S305. The MME controls the terminal to perform a CSFB operation.

All MMEs receive the IMSI paging initiated by the MSC. Only an MME to which a called terminal is attached responds to the paging, and other MMEs return paging failure messages to the target MSC. After receiving the IMSI paging of the MSC, the MME to which the terminal is attached controls the terminal that has the IMSI to perform the CSFB operation.

S306 is the same as S206.

According to the called recovery method provided in this embodiment, a target MSC performs IMSI paging by using a CSFB identifier, so as to determine an MME to which a called terminal is attached, so that the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

Embodiment 4 of the Present Invention

Figure 4:
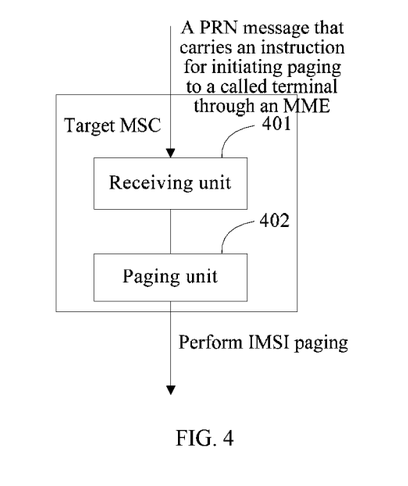
FIG. 4 is a structural diagram of a backup MSC according to Embodiment 4 of the present invention.

As shown in FIG. 4, this embodiment of the present invention provides a mobile switching center (MSC), including:

a receiving unit 401, configured to receive a PRN message sent by a backup MSC corresponding to a faulty MSC, where the PRN message carries an instruction for paging an MME, and the instruction for initiating paging to a called terminal through the MME may be an address or an index of the MME or may be a CSFB identifier; and a paging unit 402, configured to perform international mobile subscriber identity IMSI paging according to the instruction for initiating paging to a called terminal through the MME, so as to determine an MME to which a called terminal is attached, so that the MME controls the called terminal to perform circuit switched fallback CSFB to complete a called connection.

If the instruction for initiating paging to a called terminal through the MME is the address or the index of the MME, the paging unit 402 performs the IMSI paging through the MME corresponding to the address or the index. Before the faulty MSC becomes faulty, an address or an index of an MME to which a terminal is attached has been determined, and a corresponding backup MSC obtains the address or the index of the MME by extending a backup interface. Therefore, the MME is the MME to which the called terminal is attached. After receiving the IMSI paging, the MME controls the terminal to perform the CSFB to complete the called connection.

If the instruction for initiating paging to a called terminal through the MME is the CSFB identifier, the paging unit 402 initiates, according to the CSFB identifier, the IMSI paging through all MMEs corresponding to an MSC pool. After receiving the IMSI paging, the MME to which the called terminal is attached controls the called terminal to perform the CSFB to complete the called connection, and other MMEs return IMSI paging failure messages.

According to the MSC provided in this embodiment, a paging unit 402 performs IMSI paging by using an instruction for paging an MME received by a receiving unit 401, so as to determine an MME to which a called terminal is attached, so that the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

Embodiment 5 of the Present Invention

Figure 5:
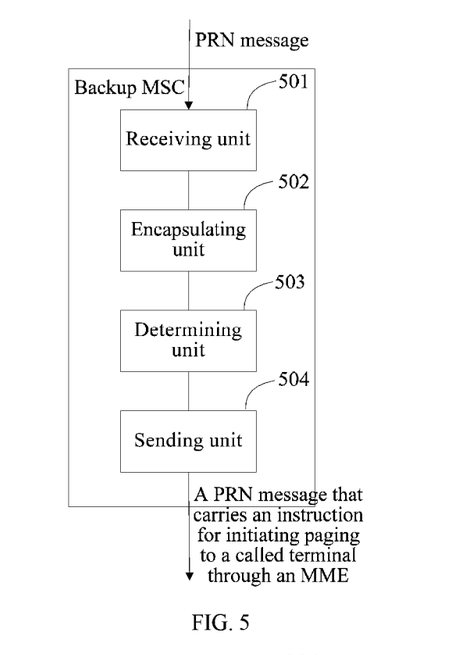
FIG. 5 is a structural diagram of a target MSC according to Embodiment 5 of the present invention.

As shown in FIG. 5, this embodiment of the present invention provides a mobile switching center MSC, including a receiving unit 501, an encapsulating unit 502, a determining unit 503, and a sending unit 504.

The receiving unit 501 is configured to receive a PRN message sent by an HLR.

Before the receiving unit 501 receives the PRN message, the MSC backs up an instruction for paging an MME.

The instruction for initiating paging to a called terminal through the MME may be an address or an index of the MME or may be a CSFB identifier. If the instruction for initiating paging to a called terminal through the MME is the address or the index of the MME, the MME is an MME to which a called terminal is attached. If the instruction for initiating paging to a called terminal through the MME is the CSFB identifier, IMSI paging needs to be performed through all MMEs to determine an MME to which a called terminal is attached.

The encapsulating unit 502 is configured to encapsulate the instruction for initiating paging to a called terminal through the MME in the PRN message received by the receiving unit 501.

The determining unit 503 is configured to determine a target MSC in an MSC pool to which the MSC belongs.

The determining unit 503 determines an MSC in the MSC pool as the target MSC. It may determine an MSC with the lowest load or may determine an MSC according to other load balance algorithms.

The sending unit 504 is configured to send the target MSC the PRN message that carries the instruction for initiating paging to a called terminal through the MME, so that the target MSC performs international mobile subscriber identity IMSI paging according to the instruction for initiating paging to a called terminal through the MME.

After the sending unit 504 sends the PRN message encapsulated by the encapsulating unit 502 to the target MSC, the target MSC acquires the instruction for initiating paging to a called terminal through the MME according to the received PRN message that carries the instruction for initiating paging to a called terminal through the MME, and initiates the IMSI paging according to the instruction, so that the MME to which the called terminal is attached controls the called terminal to perform circuit switched fallback CSFB to complete a called connection. Specifically, if the instruction for initiating paging to a called terminal through the MME is the address or the index of the MME, the IMSI paging through the MME is initiated; and if the instruction for initiating paging to a called terminal through the MME is the CSFB identifier, the IMSI paging through all MMEs corresponding to the MSC pool is initiated. The purpose is to allow the MME to which the called terminal is attached to control the terminal to perform the CSFB to complete the called connection.

According to the MSC provided in this embodiment, a determining unit determines a target MSC, and a sending unit 504 sends the target MSC a PRN message that is encapsulated by an encapsulating unit 502 and carries an instruction for paging an MME, so that the target MSC performs IMSI paging to determine an MME to which a called terminal is attached, and the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

Embodiment 6 of the Present Invention

Figure 6:
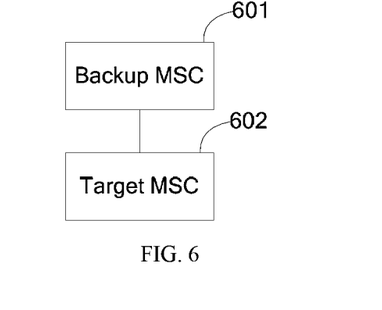
FIG. 6 is a structural diagram of a system according to Embodiment 6 of the present invention.

As shown in FIG. 6, this embodiment of the present invention further provides a called recovery system, including a backup MSC 601 and a target MSC 602.

The backup MSC 601 is configured to receive a PRN message sent by an HLR, encapsulate an instruction for initiating paging to a called terminal through an MME in the PRN message, determine a target MSC in an MSC pool to which the backup MSC belongs, and send the target MSC the PRN message that carries the instruction for initiating paging to a called terminal through the MME.

The instruction for initiating paging to a called terminal through the MME may be an address or an index of the MME or may be a CSFB identifier.

It should be noted that the backup MSC determines an MSC with the lowest load in the MSC pool as the target MSC.

The target MSC 602 is configured to receive the PRN message and is sent by the backup MSC 601, where the PRN message carries the instruction for initiating paging to a called terminal through the MME, perform IMSI paging according to the instruction, so that an MME to which a called terminal is attached controls the called terminal to perform circuit switched fallback CSFB to complete a called connection.

If the instruction for initiating paging to a called terminal through the MME is the address or the index of the MME, the target MSC 602 initiates the IMSI paging through the MME, and the MME is the MME to which the called terminal is attached.

If the instruction for initiating paging to a called terminal through the MME is the CSFB identifier, the target MSC 602 initiates the IMSI paging through all MMEs in the MSC pool, so that after receiving the IMSI paging, the MME to which the called terminal is attached controls the terminal to perform the CSFB to complete the called connection.

It should be noted that the backup MSC 601, the target MSC 602, and a faulty MSC are located in a same MSC pool.

According to the system provided in this embodiment, a target MSC performs IMSI paging according to an instruction for paging an MME sent by a backup MSC, so as to determine an MME to which a called terminal is attached, so that the MME controls the called terminal to perform a CSFB operation to complete a called connection. This solves a problem that in an MSC pool architecture, called paging in a CS domain cannot be performed when a terminal corresponding to a faulty MSC is attached to an E-UTRAN, and improves paging reliability.

It may be clearly understood by a person skilled in the art that, for the purpose of convenient and brief description, for a specific working process of the foregoing system, device and unit, reference may be made to the corresponding process in the foregoing method embodiments, and details are not described herein again.

It may be understood by a person of ordinary skill in the art that, the accompanying drawings are merely schematic views of an embodiment, and units or processes in the accompanying drawings are not necessarily required for implementing the present invention.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated units may be implemented in a form of hardware, or may also be implemented in a form of hardware plus a software functional unit.

The integrated unit implemented in a form of software functional unit may be stored in a computer readable storage medium. The software functional unit is stored in a storage medium, and contains several instructions used to instruct a computer equipment (for example, a personal computer, a server, or a network device) to perform part of the steps of the methods in the embodiments of the present invention. The foregoing storage medium includes: any medium that can store program codes, such as a USB flash disk, a removable hard disk, a read-only memory (Read-Only Memory, ROM for short), a random access memory (Random Access Memory, RAM for short), a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the scope of the technical solutions of the embodiments of the present invention.

What is claimed is:

1. A called recovery method, comprising:
receiving, by a target mobile switching center (MSC), a provide roaming number (PRN) message sent by a backup MSC corresponding to a faulty MSC, wherein the PRN message carries an instruction for initiating paging to a called terminal through a mobility management entity (MME), wherein the receiving step is preceded by selecting, by the backup MSC, an MSC with the lowest load except the faulty MSC as the target MSC and sending a PRN message that includes an address or index of the MME to the target MSC in the instruction for initiating the paging; and
performing, by the target MSC, international mobile subscriber identity (IMSI) paging according to the address or index of the MME in the instruction for initiating the paging, to enable the MME to which the called terminal is attached to control the called terminal to perform circuit switched fallback (CSFB) to complete a called connection.

2. The method according to claim 1, wherein if the instruction for initiating the paging to the called terminal through the MME is an address or an index of the MME, the performing the IMSI paging according to the instruction comprises:
performing, by the target MSC, the IMSI paging through the MME corresponding to the address or the index, wherein the called terminal is attached to the MME.

3. The method according to claim 1, wherein if the instruction for initiating the paging to the called terminal through the MME is a CSFB identifier, the performing the IMSI paging according to the instruction comprises:
initiating, by the target MSC, according to the CSFB identifier, the IMSI paging through all MMEs corresponding to an MSC pool to which the backup MSC belongs.

4. The method according to claim 1, wherein the target MSC, the backup MSC, and the faulty MSC are located in a same MSC pool.

5. The method according to claim 4, wherein the target MSC is an MSC with the lowest load except the faulty MSC in the MSC pool, and the MSC with the lowest load is determined by the backup MSC.

6. A called recovery method, comprising:
receiving, by a backup mobile switching center (MSC) corresponding to a faulty MSC, a provide roaming number (PRN) message sent by a home location register (HLR), and encapsulating an instruction for initiating paging to a called terminal through a mobility management entity (MME) in the PRN message, wherein the receiving step is preceded by selecting, by the backup MSC, an MSC with the lowest load except the faulty MSC as a target MSC and sending a PRN message that includes an address or index of the MME to the target MSC in the instruction for initiating the paging; and
determining a target MSC in an MSC pool to which the backup MSC belongs and sending the PRN message that carries the instruction to the target MSC, to enable the target MSC to perform international mobile subscriber identity (IMSI) paging according to the address or index of the MME in the instruction for initiating the paging, and to enable the MME to which the called terminal is attached to control the called terminal to perform circuit switched fallback (CSFB) to complete a called connection.

7. The method according to claim 6, wherein the target MSC, the backup MSC, and the faulty MSC are located in a same MSC pool.

8. The method according to claim 7, wherein the determining the target MSC in the MSC pool to which the backup MSC belongs comprises:
determining an MSC with the lowest load except the faulty MSC in the MSC pool to which the backup MSC belongs as the target MSC.

9. A mobile switching center (MSC), comprising a processor and a non-transitory processor-readable medium having processor-executable instructions stored thereon, such that when the instructions are executed by the processor, the MSC performs the method comprising:
receiving a provide roaming number (PRN) message sent by a backup MSC corresponding to a faulty MSC, wherein the PRN message carries an instruction for initiating paging to a called terminal through a mobility management entity (MME), wherein the receiving step is preceded by selecting, by the backup MSC, an MSC with the lowest load except the faulty MSC as the target MSC and sending a PRN message that includes an address or index of the MME to the target MSC in the instruction for initiating the paging; and
performing international mobile subscriber identity (IMSI) paging according to the address or index of the MME in the instruction for initiating the paging, to enable the MME to which the called terminal is attached to control the called terminal to perform circuit switched fallback (CSFB) to complete a called connection.

10. The MSC according to claim 9, wherein if the instruction for initiating the paging to the called terminal through the MME is an address or an index of the MME, the performing the IMSI paging according to the instruction comprises:
performing the IMSI paging through the MME corresponding to the address or the index.

11. The MSC according to claim 9, wherein if the instruction for initiating the paging to the called terminal through the MME is a CSFB identifier, the performing the IMSI paging according to the instruction comprises:
initiating according to the CSFB identifier, the IMSI paging through all MMEs corresponding to an MSC pool to which the backup MSC belongs.

12. A mobile switching center (MSC), comprising a processor and a non-transitory processor-readable medium having processor-executable instructions stored thereon, such that when the instructions are executed by the processor, the MSC performs the method comprising:
receiving a provide roaming number (PRN) message sent by a home location register (HLR);
encapsulating an instruction for initiating paging to a called terminal through a mobility management entity (MME) in the PRN message;
determining a target MSC in an MSC pool to which the MSC belongs by selecting an MSC with the lowest load except the faulty MSC as the target MSC and sending a PRN message that includes an address or index of the MME to the target MSC in the instruction for initiating the paging; and
sending the PRN message that carries the instruction to the target MSC, to enable the target MSC to perform international mobile subscriber identity (IMSI) paging according to the address or index of the MME in the instruction for initiating the paging, and to enable the MME to which called terminal is attached to control the called terminal to perform circuit switched fallback (CSFB) to complete a called connection.

13. The MSC according to claim 12, wherein the determining the target MSC in the MSC pool to which the MSC belongs comprises:
determining an MSC with the lowest load except a faulty MSC in the MSC pool as the target MSC.

14. A called recovery system, comprising a backup mobile switching center (MSC) and a target MSC, wherein:
the backup MSC is configured to receive a provide roaming number (PRN) message sent by a home location register (HLR), encapsulate an instruction for initiating paging to a called terminal through a mobility management entity (MME) in the PRN message, determine the target MSC in an MSC pool to which the backup MSC belongs, and send the PRN message that carries the instruction to the target MSC, wherein the receiving step is preceded by selecting, by the backup MSC, an MSC with the lowest load except the faulty MSC as the target MSC and sending a PRN message that includes an address or index of the MME to the target MSC in the instruction for initiating the paging; and
the target MSC is configured to receive the PRN message that carries the instruction and is sent by the backup MSC, and perform international mobile subscriber identity (IMSI) paging according to the address or index of the MME in the instruction for initiating the paging, to enable the MME to which the called terminal is attached to control the called terminal to perform circuit switched fallback (CSFB) to complete a called connection.

15. The system according to claim 14, wherein if the instruction for initiating the paging to the called terminal through the MME is an address or an index of the MME, the performing, by the target MSC, the IMSI paging according to the instruction comprises:
performing, by the target MSC, the IMSI paging through the MME corresponding to the address or the index.

16. The system according to claim 14, wherein if the instruction for initiating the paging to the called terminal through the MME is a CSFB identifier, the performing, by the target MSC, the IMSI paging according to the instruction comprises:
initiating, by the target MSC, according to the CSFB identifier, the IMSI paging through all MMEs corresponding to the MSC pool.

17. The system according to claim 14, wherein the backup MSC corresponds to a faulty MSC, and the target MSC, the backup MSC, and the faulty MSC are located in a same MSC pool.

* * * * *